United States Patent Office 3,428,690
Patented Feb. 18, 1969

3,428,690
OXIDATION OF CYCLOHEXANE
Cyril Gardner, John Fraser Prescott, and Randal George Arthur New, Manchester, England, assignors to Imperial Chemical Industries Limited, London, England, a corporation of Great Britain
No Drawing. Filed June 18, 1964, Ser. No. 376,237
Claims priority, application Great Britain, June 21, 1963, 24,810/63
U.S. Cl. 260—610     4 Claims
Int. Cl. C07c 73/06

This invention relates to the oxidation of hydrocarbons in the liquid phase.

In the oxidation of hydrocarbons such as alkanes and cycloalkanes in the liquid phase with gases containing molecular oxygen it is known to use compounds of metals as catalysts, for example the naphthenates or stearates of cobalt, iron, manganese and copper. The compounds of the metals commonly used as catalysts for the oxidation also have a catalytic effect on the decomposition of the hydroperoxides formed during the oxidation of the hydrocarbons and in the presence of these catalysts it is usually not possible to obtain hydroperoxides in good yield. In certain processes for hydrocarbon oxidation it is desirable to operate under conditions in which the metal catalysed decomposition of hydroperoxide is minimised. Such processes are further described in U.K. patent specification No. 892,723 and U.S. patent specification No. 3,035,092.

While it is possible to operate process such as those disclosed in the abovementioned specifications in absence of intentionally added metal compounds, yet it is not easy to prevent the adventitious presence of catalytic metal compounds especially when operating in equipment made of steel or other ferrous and non-ferrous metals. We have now found that the catalytic activity of metals for the decomposition of hyperoxides of hydrocarbns is inhibited by the addition to the mixtures in which the hydroperoxides are formed or are present, compounds which act as metal sequestering agents, for example ethylenediaminetetra-acetic acid and its alkali metal salts, 8-hydroxyquinoline, 1:2-diaminocyclohexanetetra-acetic acid and its alkali metal salts.

Thus according to the present invention we provide a process for the liquid phase oxidation of hydrocarbons with gases containing molecular oxygen characterised in that the oxiation is carried out in presence of a metal sequestering agent.

The amount of metal sequestering agent to be employed is not critical and quite small amounts produce a noticeable effect. Usually from about 0.001% to 5% by weight of the hydrocarbon may be employed.

The process of the invention is especially useful when the oxidation of the hydrocarbon is also performed in presence of boric acid, for example, in the oxidation of cyclohexane. However, the invention can also be operated quite successfully in absence of boric acid, and furthermore other hydrocarbons such as cyclopentane methylcyclohexane, cyclooctane, open chain saturated and olefinic aliphatic and aryl-aliphatic hydrocarbons may be usefully employed in the process of the invention as well as cyclohexane.

The invention is illustrated but not limited by the following examples.

EXAMPLE 1

778 grams of cyclohexane and 3.9 g. of ethylene diamine tetra acetic acid disodium salt were charged to a 5 feet long by 2 inch diameter stainless steel reactor. The reactor was pressurised with nitrogen to 180 p.s.i.g. and heated to 175° C. Air was passed at a rate of 100 l./hr. for 30 minutes. The reactor was cooled to 20° C. and the product removed. The product contained 2.36% w./w. of cyclohexyl hydroperoxide.

When the experiment was carried out similarly but without addition of ethylene diamine tetracetic acid the percentage of cyclohexyl hydroperoxide in the product was only 0.3% w./w.

EXAMPLE 2

775 grams of cyclohexane containing 0.24 g. of 8-hydroxy-quinoline were charged to a stainless steel reactor and oxidised with air at 175° C. and 180 p.s.i.g. for 30 minutes as in Example 1. The product contained 1.68% w./w. of cyclohexyl hydroperoxide.

What we claim is:

1. In a process for the liquid phase oxidation of cyclohexane with a gas containing molecular oxygen in ferrous metal containing apparatus wherein the reaction product comprises cyclohexane hydroperoxide, the improvement comprising oxidising said cyclohexane in the presence of a member of the group consisting of ethylenediamine tetraacetic acid and the alkali metal salts thereof, 8-hydroxy quinoline and 1:2-diaminocyclohexane tetraacetic acid and the alkali metal salts thereof.

2. The process as claimed in claim 1 wherein said member is ethylenediamine tetraacetic acid.

3. The process of claim 1 wherein said ferrous metal containing apparatus is a steel apparatus.

4. The process as claimed in claim 1 wherein the oxidation is performed in presence of boric acid.

References Cited

UNITED STATES PATENTS

| | | | |
|---|---|---|---|
| 3,208,825 | 9/1965 | Meeker | 23—207.5 |
| 3,058,632 | 9/1962 | Meeker | 23—207.5 |
| 2,861,107 | 11/1958 | Hiratsuka | 260—610 |

FOREIGN PATENTS

| | | |
|---|---|---|
| 700,546 | 12/1953 | Great Britain. |
| 906,970 | 9/1962 | Great Britain. |

OTHER REFERENCES

Geigy Chem. Corp.: "Sequestrene" (1952).
Dow Chem. Co.: "Keys to Chelation" (1957).

BERNARD HELFIN, Primary Examiner.
W. B. LONE, Assistant Examiner.